June 14, 1927.
M. R. LANE
1,632,553
APPARATUS FOR SUPPORTING LAWN TENNIS NETS AND THE LIKE
Filed Sept. 26, 1925
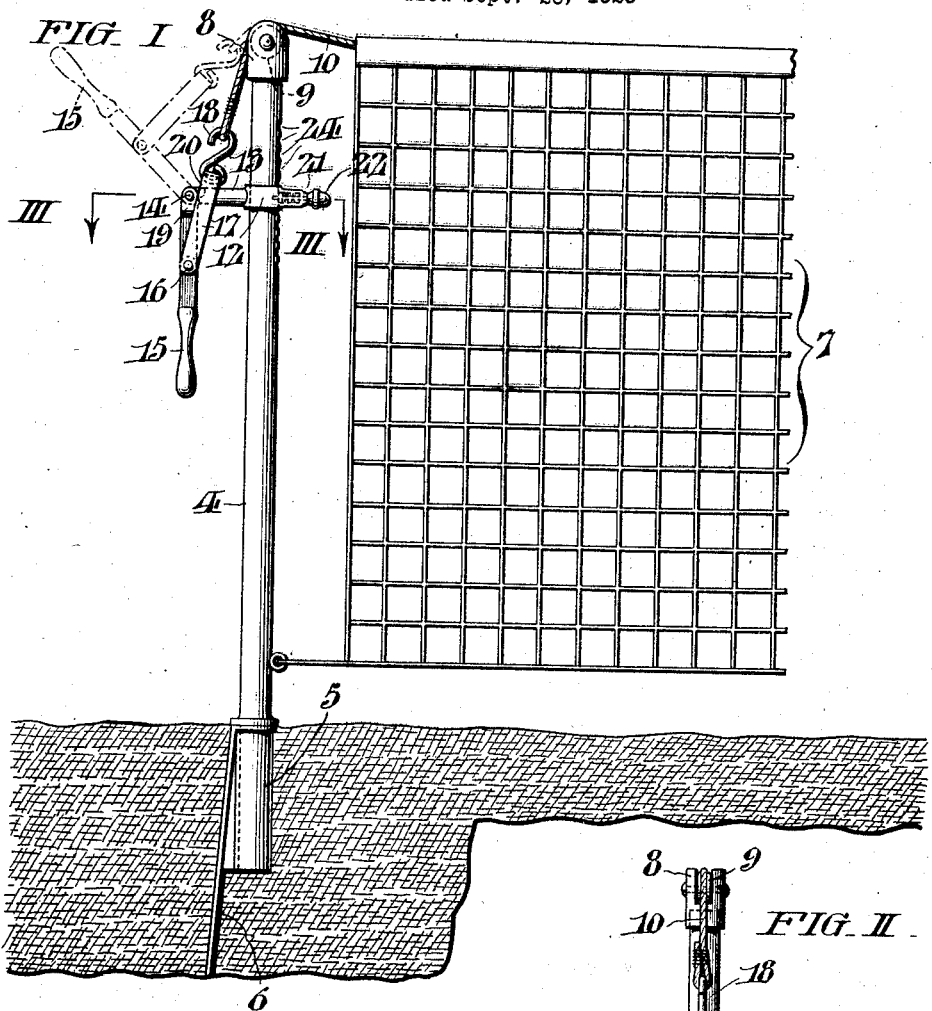
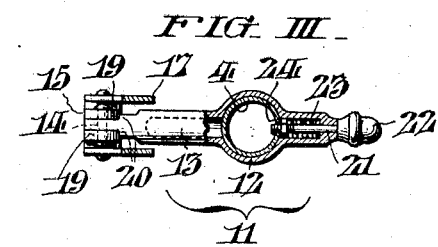
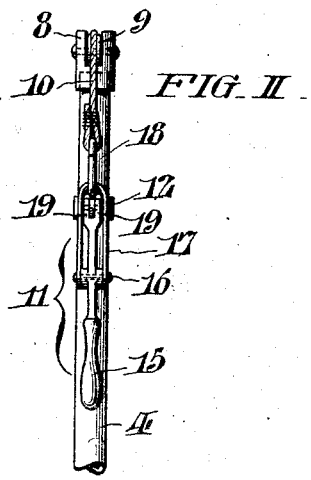
WITNESSES
INVENTOR:
Moses R. Lane,
BY
ATTORNEYS Patented June 14, 1927.

1,632,553

UNITED STATES PATENT OFFICE.

MOSES R. LANE, OF ARDMORE, PENNSYLVANIA.

APPARATUS FOR SUPPORTING LAWN-TENNIS NETS AND THE LIKE.

Application filed September 26, 1925. Serial No. 58,701.

This invention relates to apparatus useful more particularly in supporting lawn tennis nets, although, as will appear from the detailed description hereinafter, it is as readily adaptable to other uses, e. g., in supporting screens, shades and the like. Generally speaking, my apparatus is similar to that shown and described in U. S. Patent No. 1,224,388, granted to George Lane and dated May 1, 1917, in that it comprises a net tensioning device capable of being bodily shifted along one of the supporting posts to compensate for the permanent stretch or set of the tennis net from time to time.

With the patented structure, difficulty was often experienced in preventing slipping of the net-tensioning device, especially while manipulating the same to stretch the net; and one of the objects of my invention is to overcome the annoyance noted, and this I accomplish by provisions for interlock as between the relatively shiftable parts to insure positively against slippage.

The present invention is further directed to various structural refinements which will be individually manifest from the following description.

With reference to the illustrations herewith, Fig. I is a fragmentary elevation of a tennis net organization conveniently embodying my improvements.

Fig. II is an elevation of the structure as viewed from the left of Fig. I; and

Fig. III is a plan section on a larger scale taken as indicated by the arrows III—III in Fig. I.

The post indicated at 4, is removably sustained in a sunken socket 5, which, in the present instance, is equipped with an anchorage plate 6 capable of resisting the constant strain of the net 7. To the top of the post 4 is secured a fitting 8 affording bearings for a sheave 9 over and about which the net rope 10 passes for connection to the tensioning device comprehensively indicated at 11.

As shown, the tensioning device 11 comprises a collar 12 that embraces the post 4, and from which projects, at one side, an arm 13 whereof the outer end provides a fulcrum 14 for an actuating lever handle 15. Pivotally attached at a point 16, about midway of the length of the lever handle 15 and with capacity to swing over the fulcrum 14, is a yoked link 17. An S hook 18 serves as a self-adjusting coupling connector between the link 17 and the net rope 10. As the lever handle 15 is swung from the dotted to the full line position in Fig. I, it will be observed that it and the link 17 function after the manner of a toggle couple to draw upon the net rope 10. The "closed" or normal position of the lever handle 15 is determined by engagement of its clevis cheeks 19 with cooperating stop shoulders 20 at opposite sides of the arm 13 of the collar 12. When the lever handle 15 is in this position, it will be observed that the yoked link 17 assumes an angular position to the inside of the fulcrum center 14, and is thus effectively held against outward displacement by the tension of the rope 10 so that the net 7 is thereafter maintained in the desired stretched condition.

In order to compensate from time to time for the permanent set or stretch in the rope 10 due to the strain to which it is constantly subjected, provision is made for shifting the tensioning device 11 bodily along the post 4. The means which I employ to enable and positively maintain such adjustments, includes a pin 21 which is guided in a lateral boss of the collar 12 and provided at its outer end with a knob 22 by which it may be retracted against an influencing spring 23 tending to press it inward. By this arrangement, the pin 21 may be selectively engaged with longitudinally spaced indentations or holes 24 in the post 4 in accordance with the slack required to be taken up, whereupon the lever handle 15 is manipulated, as previously explained, to place the net 7 under the desired tension. The interlock established by the means just described insures the tensioning device against shifting or slipping as the lever handle 15 is moved to the down or closed position.

Having thus described my invention, I claim:

1. In apparatus for supporting lawn tennis nets and the like, the combination of a post having a series of longitudinally spaced indentations and a toggle net-tensioning device, and a spring-influenced pin included in the tensioning device adapted to engage the post indentations to lock said device in adjusted position.

2. In apparatus for supporting lawn tennis nets and the like, the combination of a post having a longitudinally indented portion, an embracing collar carrying a toggle net-tensioning means, and a spring-influenced retractable pin in said collar co-operative with the indented portion of the post in maintaining the net in adjusted position.

3. In apparatus for supporting lawn tennis nets and the like, the combination of a post having a series of longitudinally spaced indentations, and a toggle net-tensioning device including a retractable spring-influenced pin for engaging the indentations to rigidly lock said net-tensioning device in adjusted positions along the post.

4. In apparatus for supporting lawn tennis nets and the like, the combination of a post and a net-tensioning device including a collar adapted for positive locking on said post at different adjustments, a handle fulcrumed on the collar, and a pivotally-attached link constituting, with said handle, a toggle couple for drawing upon the net.

5. In apparatus for supporting lawn tennis nets and the like, the combination of a post, and a net-tensioning device including a collar adjustable on the post, a handle fulcrumed on the collar, and a pivotally-attached yoked link swingable over the fulcrum and constituting, with the said handle, a toggle couple for drawing upon the net.

In testimony whereof, I have hereunto signed my name at Philadelphia, Pennsylvania this twenty-second day of September 1925.

MOSES R. LANE.